United States Patent
Yoshida et al.

[19]

[11] Patent Number: 5,892,560

[45] Date of Patent: *Apr. 6, 1999

[54] LIQUID CRYSTAL DISPLAY UNIT WITH A DIAMETER OF THE LIQUID CRYSTAL DROPLETS BEING GREATER THAN A SPACE BETWEEN THE PAIR OF SUBSTRATES AND METHOD FOR ITS PRODUCTION

[75] Inventors: Hidefumi Yoshida; Kimiaki Nakamura; Hideaki Tsuda; Takahiro Sasaki; Hideo Chida; Kazutaka Hanaoka, all of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 565,320

[22] Filed: Nov. 30, 1995

[30] Foreign Application Priority Data

Mar. 10, 1995 [JP] Japan .................................... 7-050745

[51] Int. Cl.$^6$ ............................. G02F 1/1333; G02F 1/13; G02F 1/1341
[52] U.S. Cl. ............................... 349/89; 349/86; 349/92; 349/180; 349/189
[58] Field of Search .......................... 359/51, 52; 349/86, 349/180, 189, 92, 89

[56] References Cited

U.S. PATENT DOCUMENTS 4,944,576  7/1990  Lacker et al. ............................. 359/51
5,142,389  8/1992  Fergason .................................. 359/51
5,473,450  12/1995 Yamada et al. .......................... 349/89

FOREIGN PATENT DOCUMENTS 4-7518    1/1992  Japan .
4-212928  8/1992  Japan .
5-027242  2/1993  Japan .

OTHER PUBLICATIONS

Iimura et al., "44.1: *Invited Address:* Electro–Optic Characteristics of Amorphous and Super–Multidomain TN–LCDs Prepared by a Non–Rubbing Method," *SID 94 DIGEST*, ISSN00970966X/94/2501–0915, pp. 915–918.

*Primary Examiner*—William L. Sikes
*Assistant Examiner*—Julie Ngo
*Attorney, Agent, or Firm*—Staas & Halsey

[57] ABSTRACT

A liquid crystal cell filled with a polymer-dispersed liquid crystal layer 15 comprising liquid crystal droplets $15_1$ dispersed in a polymer $15_2$ between a first glass base plate 11 with a first transparent electrode 12 and a second glass base plate 13 with a second transparent electrode 14, is placed between crossed Nicols formed by a first polarizer 16 and a second polarizer 17, with a backlight 18 situated on the outer side thereof, the diameter of the liquid crystal droplets $15_1$ is between 3 $\mu$m and 100 $\mu$m, and the liquid crystal molecules in the liquid crystal droplets $15_1$ are twisted to between 30° and 180°. The liquid crystals used have a dielectric anisotropy $\Delta\epsilon$ which is negative when the frequency of the electric field is high and positive when the frequency is low, and by adjusting the dielectric anisotropy $\Delta\epsilon$ via the frequency of the electric field it is possible to form liquid crystal droplets of a desired diameter.

10 Claims, 6 Drawing Sheets

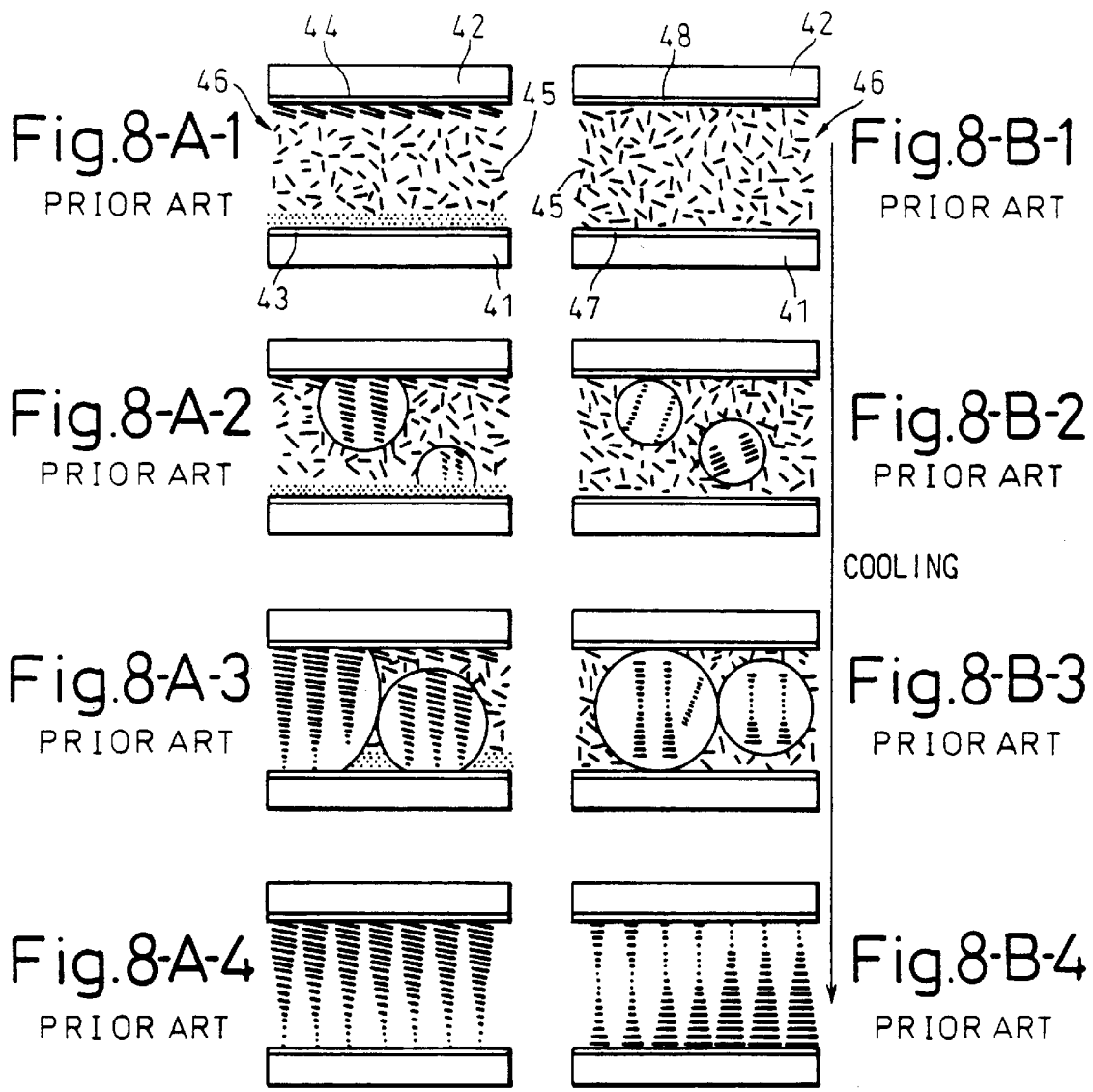

LIQUID CRYSTAL DISPLAY UNIT WITH A DIAMETER OF THE LIQUID CRYSTAL DROPLETS BEING GREATER THAN A SPACE BETWEEN THE PAIR OF SUBSTRATES AND METHOD FOR ITS PRODUCTION

BACKGROUND OF THE INVENTION

1. Field of the Invention

The present invention relates to a liquid crystal display unit and a method for its production.

In recent years, the display areas of liquid crystal display units of such devices as computer terminals, personal computers, word processors, TVs and the like have become increasingly larger, and their uses are expected to become further expanded in the future, accompanied by greater demand to realize liquid crystal display units with visual angle characteristics equaling those of CRTs (cathode ray tubes).

2. Description of the Related Art

Some techniques have already been proposed for improving viewing angle characteristics, including a PDN type (Polymer Dispersed Liquid Crystal Display with Crossed Nicols; see Japanese Unexamined Patent Publication No. 4-212928), an amorphous TN type (Amorphous Twisted Nematic Liquid Crystal Display; see SID '94 Digest, p. 915–918) and a PTN type (Polymer Twisted Nematic Liquid Crystal Display; see Japanese Unexamined Patent Publication No. 5-27242).

FIGS. 7A and 7B are illustrations of PDN-type liquid crystal display units of the prior art, FIG. 7A showing a state without application of voltage and FIG. 7B showing a state with application of voltage.

In these drawings, 21 is a transparent base plate, 22 is a transparent conductive film, 23 is a transparent base plate, 24 is a transparent conductive film, 25 is a polymer, 26 is a liquid crystal molecule, 27 is a liquid crystal droplet, 28 is a liquid crystal layer, 29 and 30 are polarizer, 31 is a round cushion-shaped film with optical anisotropy, 32 is an alternating current power source and 33 is a switch.

In this conventional PDN-type liquid crystal display unit, the opposing transparent base plate 21 with the transparent conductive film 22 and transparent base plate 23 with the transparent conductive film 24 form a structure sandwiching the liquid crystal layer 28 containing the polymer 25 and liquid crystal droplets 27. Also, the pair of polarizers 29 and 30 whose directions of polarization are orthogonal are laid over the outside of the transparent base plates 21 and 23.

A round cushion-shaped film 31 with optical anisotropy, such as a polycarbonate polyaxially stretched film, is laid between the transparent base plate 23 and the polarizer 30 on the display side.

The alternating current power source 32 and the switch 33 are connected in series between the transparent conductive film 22 and the transparent conductive film 24.

In this liquid crystal display unit, when no voltage is applied from the alternating current power source 32 between the transparent conductive films 22 and 24, the liquid crystal molecules 26 in each of the liquid crystal droplets 27 are controlled so as to line up at the interface with the polymer 25, but since the orientation of the liquid crystal molecules 26 on the liquid crystal droplets 27 is unordered, incident light 34 from the back side is scattered by the liquid crystal molecules 26 and passes through the polarizing plate 30 appearing milky white, and bright (see FIG. 7A).

When a voltage is applied from the alternating current power source 32 between the transparent conductive films 22 and 24, the liquid crystal molecules 26 in the liquid crystal droplets 27 align in the direction of the electric field, and as a result light scattering is reduced and incident light 34 from the back side may pass through the liquid crystal layer 28 unhindered.

However, since the polarizers 29 and 30 are arranged in crossed Nicols, the light cannot pass through the polarizer 30, giving a dark appearance.

When the liquid crystal panel of this liquid crystal display unit is viewed at an oblique inclination angle, the liquid crystal molecules 26 and the incident light 34 both are viewed from an oblique inclined angle and the optical effect of the liquid crystal layer 28 appears to some degree causing light leakage, and therefore the round cushion-shaped film 31 with optical anisotropy is inserted to block the resulting leaking light which passes through the polarizing plate 30.

Generally speaking, when the refractive index of a liquid crystal molecule is expressed in three-dimensional terms it may be compared to a rugby ball-shaped index ellipsoid, and the refractive index when viewed at an oblique inclination angle corresponds to the ellipse section resulting from cutting the rugby ball-shaped index ellipsoid at an oblique inclination angle.

On the other hand, when the refractive index of a molecule of the round cushion-shaped film with optical anisotropy is expressed in three-dimensional terms, it exhibits the characteristics of a round cushion-shaped index ellipsoid, and the refractive index thereof when viewed at an oblique inclination angle corresponds to the ellipse section resulting from cutting the round cushion at an oblique inclination angle.

Also, the ellipse section resulting from cutting the rugby ball-shaped index ellipsoid of the liquid crystal molecule at an oblique inclination angle and the ellipse section resulting from cutting the index ellipsoid of the round cushion-shaped film with optical anisotropy at an oblique inclination angle have their long axes and short axes rotated 90° to each other.

Consequently, when the ellipse section resulting from cutting the rugby ball-shaped index ellipsoid of the liquid crystal molecule at an oblique inclination angle and the ellipse section resulting from cutting the index ellipsoid of the round cushion-shaped film with optical anisotropy at an oblique inclination angle are superimposed a circle results, and the optical effect is canceled out.

Therefore, as mentioned above, the superimposition of the round cushion-shaped film 31 with optical anisotropy cancels out the effect of the inclined incident light, and therefore the black display produced when a voltage is applied between the electrodes has a consistently dark appearance even when viewed from an oblique inclination angle, giving a constant display when viewed from any direction, and producing the effect of a wider visual angle.

FIGS. 8-A-1 to 8-A-4 and 8-B-1 to 8-B-4 are illustrations of amorphous TN-type liquid crystal display units of the prior art, FIGS. 8-A-1 to 8-A-4 showing the prior art and FIGS. 8-B-1 to 8-B-4 showing amorphous TN-type liquid crystal display units.

In these drawings, 41 is a first transparent conductive base plate, 42 is a second transparent conductive base plate, 43 and 44 are alignment films, 45 is a liquid crystal molecule, 46 is a liquid crystal layer and 47 and 48 are non-rubbed polymer films.

A prior art TN (Twisted-nematic) liquid crystal display unit with rubbed alignment films will now be explained with reference to FIGS. 8-A-1 to 8-A-4.

In this TN liquid crystal display unit of the prior art, the liquid crystal layer 46 comprised of liquid crystal molecules 45 is sandwiched between the first transparent conductive base plate 41 with an alignment film 43 which is rubbed in the direction perpendicular to the plane of the paper, and the second transparent conductive base plate 42 with an alignment film 44 which is rubbed left to right on the plane of the paper.

In this TN liquid crystal display unit, even at clearing temperatures at which the orientation of the liquid crystal molecules 45 is random (isotropic), the liquid crystal molecules 45 contacting with the alignment films 43 and 44 of the first transparent conductive base plate 41 and the second transparent conductive base plate 42 which are rubbed in orthogonal directions are aligned in these respective directions of alignment by the restraint of the alignment films 43 and 44 (see FIG. 8-A-1).

When the temperature is lowered below the clearing temperature, the effect of the liquid crystal molecules 45 contacting with the upper and lower alignment films 43 and 44 reaches inside the liquid crystal layer 46, and a column of liquid crystal molecules 45 begins to grow (see FIG. 8-A-2).

When the temperature is further lowered, the effect of the liquid crystal molecules 45 contacting with the upper and lower alignment films 43 and 44 reaches further inside the liquid crystal layer 46, and the column of liquid crystal molecules 45 grows larger (see FIG. 8-A-3).

When the temperature is even further lowered, the effect of the liquid crystal molecules 45 contacting with the upper and lower alignment films 43 and 44 reaches even further inside the liquid crystal layer 46, and the column of liquid crystal molecules 45 is completely formed between the upper and lower alignment films 43 and 44. Since the twist origins of the liquid crystal molecules 45 are the same in state, the viewing angle characteristics are narrower (see FIG. 8-A-4).

An amorphous TN-type liquid crystal display unit will now be explained with reference to FIGS. 8-B-1 to 8-B-4.

In this amorphous TN-type liquid crystal display unit, the liquid crystal layer 46 comprising liquid crystal molecules 45 is sandwiched between a first transparent conductive base plate 41 and a second transparent base plate 42 with non-rubbed polymer (polyimide PI) films 47 and 48.

In this amorphous TN-type liquid crystal display unit, at clearing temperatures at which the orientation of the liquid crystal molecules 45 is random, the surfaces of the non-rubbed polymer films 47 and 48 in contact with the liquid crystal molecules 45 are rough, and therefore the liquid crystal molecules 45 are not aligned, being oriented in random directions (see FIG. 8-B-1).

When the temperature is further lowered, a column of aligned liquid crystal molecules 45 does not grow from the surface of the liquid crystal layer 46 in contact with the non-rubbed polymer films 47 and 48, but rather grows from the interior (bulk region) (see FIG. 8-B-2).

When the temperature is even further lowered, the alignment of the liquid crystal molecules 45 occurring in the bulk region is promoted, causing the column of liquid crystal molecules 45 to grow larger (see FIG. 8-B-3).

When the temperature is still further lowered and a temperature of 30° C. below the clearing temperature is maintained, the alignment of the liquid crystal molecules 45 occurring in the bulk region is further promoted, and the column of liquid crystal molecules 45 in each region is completed between the non-rubbed polymer films 47 and 48, with the liquid crystal molecules 45 becoming rigidly fixed in that state (memory effect).

In this state, the twist origins of the liquid crystal molecules 45 in contact with the surfaces of the non-rubbed polymer films 47 and 48 are random, and therefore the viewing angle characteristics of each of the columns of liquid crystal molecules 45 are averaged to provide improved viewing angle characteristics and to obtain a gray scale (see FIG. 8-B-4).

FIG. 9 is an illustration of a PTN-type liquid crystal display unit of the prior art.

In this drawing, 51 and 52 are transparent conductive base plates, 53 denotes liquid crystal molecules, and 54 denotes a material which disturbs the twisted arrangement of the liquid crystal molecules.

In this conventional PTN-type liquid crystal display unit, liquid crystals such as cholesteric liquid crystals or chiral nematic liquid crystals are injected between the pair of transparent conductive base plates 51 and 52 with transparent electrodes and alignment films on their opposing inner sides, and there is also injected a material 54 to disturb the twisted arrangement of the liquid crystal molecules, for example an organic polymer such as polymethyl methacrylate, polystyrene melamine resin, urea resin, phenol resin or polydiisopropyl fumarate, or a photopolymerized polymer such as polyurethane acrylate, polyester acrylate, epoxy acrylate or polyether acrylate, in order to change the arrangement of the liquid crystal molecules 53.

As a result, the twisted orientations of the liquid crystal molecules along the lines A, B and C vary slightly depending on the position of the liquid crystal layer, even with the same viewing angle direction.

Since the twisted orientations of the liquid crystal molecules 53 vary slightly along the lines A, B and C in this drawing, application of a voltage causes the liquid crystal molecules 53 to be aligned differently, and the orientations of the liquid crystal molecules 53 are averaged with respect to the viewing angle direction, thus resulting in averaging of the apparent transmittance/applied voltage characteristics, improved viewing angle characteristics, and suppression of the abnormal display inversion phenomenon.

In the PDN-type liquid crystal display unit described above it has not been possible to impart optical activity to the liquid crystal molecules, and consequently the display brightness of displayed white has been only ⅓ that of TN-types.

In addition, the sizes of the domains lack uniformity in amorphous TN-type liquid crystal display units and are large, and when the display surface is viewed from an oblique inclination angle a patchy black and white pattern is produced.

When the display surface is viewed from an oblique inclination angle, the black portions and white portions are of an extremely small identical size and there are few problems so long as they are dispersed, but since the domains are large, they appear as patches.

This condition is the same in the case of PTN-type liquid crystal display units, which have had the problem of patchiness when viewed from an oblique inclination angle.

It is an object of the present invention to provide a liquid crystal display unit with satisfactory viewing angle characteristics and which eliminates such patches when viewed from an oblique inclination angle.

SUMMARY OF THE INVENTION

The liquid crystal display unit according to the present invention has a structure wherein a liquid crystal cell filled between a pair of electrodes with polymer-dispersed liquid crystals consisting of liquid crystal droplets dispersed in a polymer is placed between crossed Nicols, the diameter of the liquid crystal droplets is between 3 μm and 100 μm, and the liquid crystal molecules in the droplets are twisted to between 30° and 180°.

When the diameter of the liquid crystal droplets is less than 3 μm the liquid crystal molecules undergo anchoring, and when it is greater than 100 μm the rate of domain wall formation (discrimination) is increased, thus lowering the quality of the display.

Also, when the liquid crystal molecules are twisted to between 30° and 180° it is possible to display high purity whiteness by using the crossed Nicols.

In this case, the diameter of the liquid crystal droplets may be made larger than the space between the pair of electrodes, and the liquid crystal molecules in the liquid crystal droplets may be contacted with the alignment film to achieve alignment in a desired direction.

Furthermore, by using polymer-dispersed crystals whose dielectric anisotropy $\Delta\epsilon$ is positive in low-frequency electric fields (for example, frequencies lower than 100 Hz) and negative in high-frequency electric fields (for example, frequencies higher than 100 Hz), the alignment may be stabilized.

The method of producing a liquid crystal display unit according to the present invention includes a step of filling polymer-dispersed liquid crystals whose dielectric anisotropy $\Delta\epsilon$ is positive in low-frequency electric fields (for example, frequencies lower than 100 Hz) and negative in high-frequency electric fields (for example, frequencies higher than 100 Hz), between a pair of electrodes, and applying to the polymer-dispersed liquid crystals a high-frequency electric field (for example, a frequency higher than 100 Hz) in which the dielectric anisotropy $\Delta\epsilon$ of the polymer-dispersed liquid crystals is negative, to form liquid crystal droplets.

BRIEF DESCRIPTION OF THE DRAWINGS

FIGS. 8-A-1 to 8-A-4 and 8-B-1 to 8-B-4 are illustrations of conventional TN-LCD and amorphous TN-type liquid crystal display units, FIGS. 8-A-1 to 8-A-4 showing the conventional TN-LCD and FIGS. 8-B-1 to 8-B-4 showing amorphous TN-type liquid crystal display units.

DETAILED DESCRIPTION OF THE INVENTION

Figure 1:
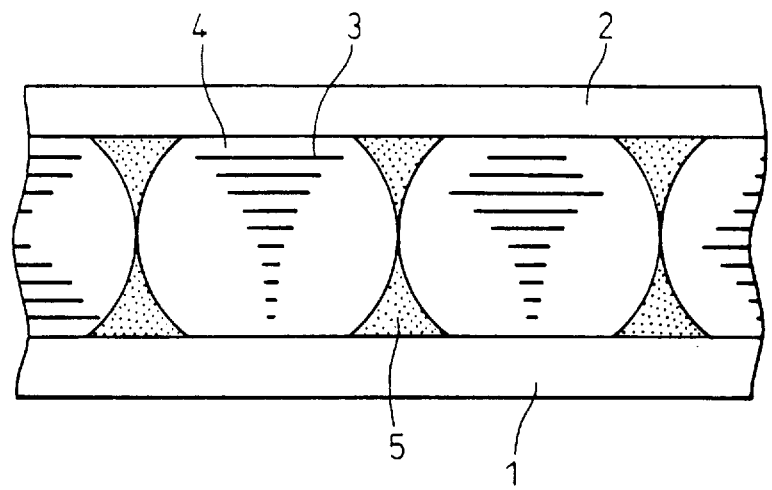
FIG. 1 is a drawing illustrating the principle of a liquid crystal display unit of the present invention.

FIG. 1 is a drawing illustrating the principle of a liquid crystal display unit of the present invention.

In FIG. 1, 1 is a first transparent conductive base plate, 2 is a second transparent conductive base plate, 3 is a liquid crystal molecule, 4 is a liquid crystal droplet and 5 is a polymer.

This is a rough drawing serving to illustrate the principle of a liquid crystal display unit of the present invention which has a construction wherein liquid crystal droplets 4 consisting of liquid crystal molecules 3 dispersed in a polymer 5 are sandwiched between the parallel-situated first transparent conductive base plate 1 and second transparent conductive base plate 2.

The liquid crystal display unit of the present invention has the following features.

The liquid crystal molecules 3 used have a spontaneously twisting character, such as cholesteric crystals obtained by adding a chiraling agent to nematic crystals.

The diameter of each of the crystal droplets 4 is at least 3 μm, including cases where the diameter is larger than the space between the first transparent conductive base plate 1 and the second transparent conductive base plate 2.

When the diameter of a liquid crystal droplet 4 is larger than the distance between the first transparent conductive base plate 1 and the second transparent conductive base plate 2, the liquid crystal droplet 4 cannot become spherical, being crushed at the top and bottom by the first transparent conductive base plate 1 and second transparent conductive base plate 2, into a beer barrel shape.

Also, in order to further promote the above-mentioned effect, it is effective to use liquid crystals of which the polarity of the dielectric anisotropy $\Delta\epsilon$ changes depending on the frequency of the electric field applied.

When a liquid crystal whose dielectric anisotropy $\Delta\epsilon$ is negative at high-frequencies (for example, frequencies higher than 100 Hz) and whose dielectric anisotropy $\Delta\epsilon$ is positive at low-frequencies (for example, frequencies lower than 100 Hz) is injected between a pair of transparent conductive base plates while applying an electric field of a high-frequency region, the negative dielectric anisotropy $\Delta\epsilon$ of the liquid crystal causes the liquid crystal molecules to twist horizontally with respect to the transparent conductive base plates.

The completed liquid crystal display unit is driven by a low frequency voltage.

The outside of the first transparent conductive base plate 1 and the second transparent conductive base plate 2 of this liquid crystal display unit are sandwiched by crossed Nicol polarizers whose polarizing directions are perpendicular.

An optical film such as a uniaxial retardation film may also be added.

By using twisted liquid crystals it is possible to optically rotate, by 90°, the light which enters the liquid crystal display unit, and this allows improvement in the white brightness as with a TN-type liquid crystal display unit.

If the diameters of the liquid crystal droplets 4 are too small, anchoring of the polymer 5 to the wall surface prevents twisting of the liquid crystal molecules 3.

Twisting of the liquid crystal molecules 3 becomes possible by giving the liquid crystal droplets 4 a diameter of at least 3 μm.

Examples of the present invention will now be explained in detail with reference to the drawings.

EXAMPLE 1

Figure 2:
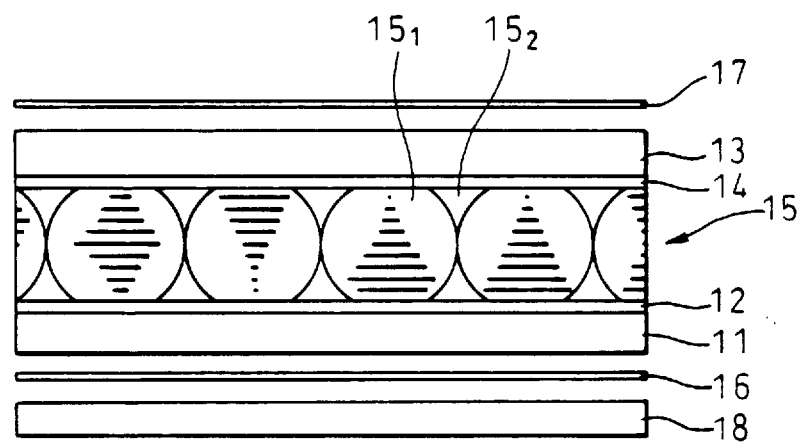
FIG. 2 is a schematic diagram of the liquid crystal display unit of Example 1.

FIG. 2 is a schematic diagram of the liquid crystal display unit of Example 1.

In FIG. 2, 11 is a first glass base plate, 12 is a first transparent electrode, 13 is a second glass base plate, 14 is a second transparent electrode, 15 is a polymer-dispersed liquid crystal layer, $15_1$ is a liquid crystal droplet, $15_2$ is a polymer, 16 is a first polarizer, 17 is a second polarizer and 18 is a backlight.

In the liquid crystal display unit of this example, the polymer-dispersed liquid crystal layer 15 containing the liquid crystal droplets $15_1$ and the polymer $15_2$ is sandwiched between the first glass base plate 11 with the first transparent electrode 12 and the second glass base plate 13 with the second transparent electrode 14, and these are further sandwiched by the first polarizer 16 and second polarizer 17.

A backlight 18 is also situated opposite the first polarizer 16.

In this instance, fluorine-based liquid crystals (ZLI4792 of Merck Co.) or chlorine-based liquid crystals (TL-202) were used as the liquid crystals, a urethane-based UV-curing resin (R167 of Nihon Kayaku) was used as the polymer $15_2$, and about 0.4 wt % of a chiraling agent (CM33 of Chisso Co.) was added to the liquid crystals to form a structure wherein the liquid crystal molecules spontaneously twisted 90°.

During the production of this liquid crystal display unit, the first glass base plate 11 with the first transparent electrode 12 and the second glass base plate 13 with the second transparent electrode 14 are placed together with the first transparent electrode 12 and second transparent electrode 14 facing the inside, the above-mentioned liquid crystals and polymer are mixed together and injected in the space between them, and the unit is subjected to ultraviolet irradiation to cause phase separation of the liquid crystal droplets $15_1$ in the polymer $15_2$.

In order to give the liquid crystal droplets $15_1$ a large diameter, the ultraviolet light is irradiated at a particularly low intensity of 0.05 mW/cm², which makes it possible to yield liquid crystal droplets $15_1$ with a diameter of about 10 μm.

If the thickness of the space between the i.e. the space between the first transparent electrode 12 and the second transparent electrode 14 is about 5 μm, the tops and bottoms of the liquid crystal droplets $15_1$ may become compressed into a beer barrel (drum) shape.

Since the first glass base plate 11 and the second glass base plate 13 are aligned horizontally and parallel, the liquid crystal molecules are aligned horizontal to the first glass base plate 11 and the second glass base plate 13, and the axis of twist is perpendicular to the first glass base plate 11 and the second glass base plate 13.

The unit is irradiated with the backlight 18, and light which has passed through the first polarizer 16 is rotated by the liquid crystal molecules and passes through the second polarizer 17.

It was possible to achieve a satisfactory display with no irregularity in the particles by making the diameter of the liquid crystal droplets $15_1$ between 3 μm and 50 μm.

In this example, a liquid crystal display unit with a polymer-dispersed liquid crystal layer 15 sandwiched between a first transparent electrode 12 and a second transparent electrode 14 was described and, needless to mention, images may be displayed by situating picture elements into a given two-dimensional structure and controlling the voltage applied to each picture element via a TFT or the like.

Figure 3:
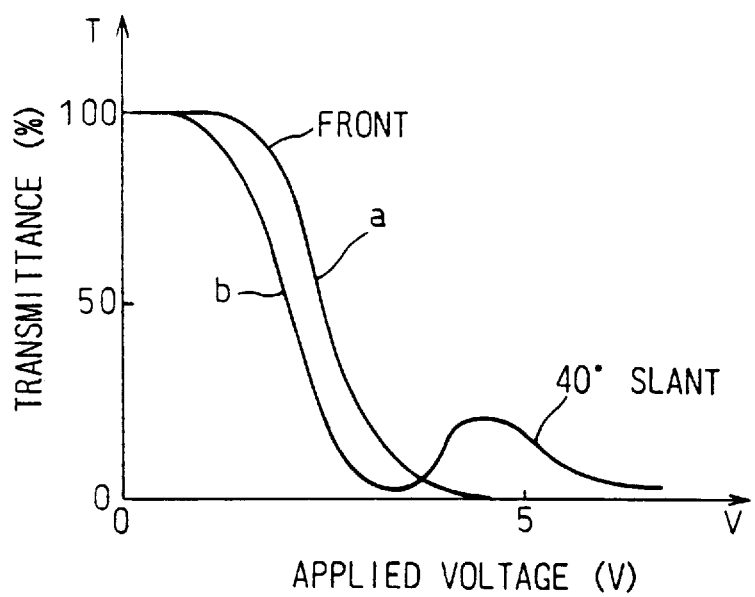
FIG. 3 is an illustration of the viewing angle characteristics of a TN-type liquid crystal display unit of the prior art.

FIG. 3 is an illustration of the visual angle characteristics of a TN-type liquid crystal display unit of the prior art.

Plotted on an x-axis of voltage applied and a y-axis of transmittance, a is the transmittance from the front and b is the transmittance at a 40° angle.

Figure 4:
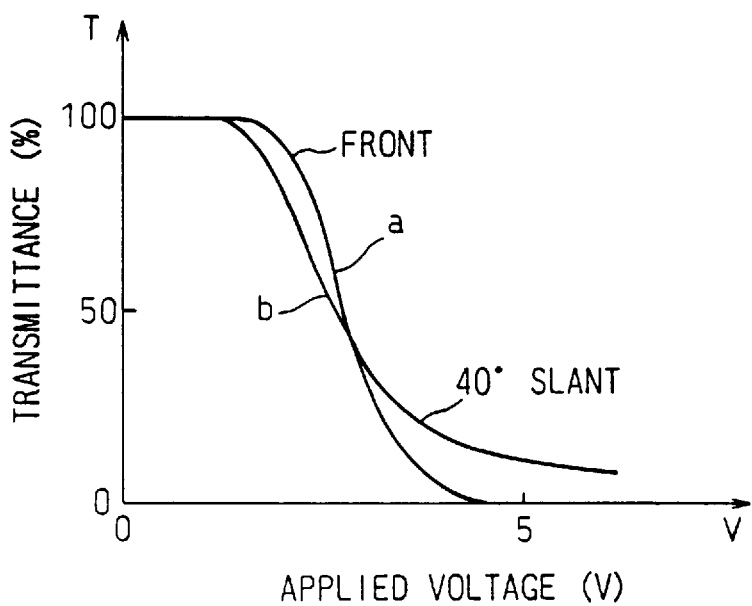
FIG. 4 is an illustration of the viewing angle characteristics of the liquid crystal display unit of Example 1.

FIG. 4 is an illustration of the viewing angle characteristics of the liquid crystal display unit of Example 1.

Plotted on an x-axis of voltage applied and a y-axis of transmittance, a is the transmittance from the front and b is the transmittance at a 40° angle.

Upon comparing FIGS. 3 and 4, it is seen that the viewing angle characteristics of the liquid crystal display unit of this example are improved over those of the liquid crystal display unit of the prior art, in that the inversion of the display in an oblique inclination viewing directions which occurred is eliminated.

Figure 5:
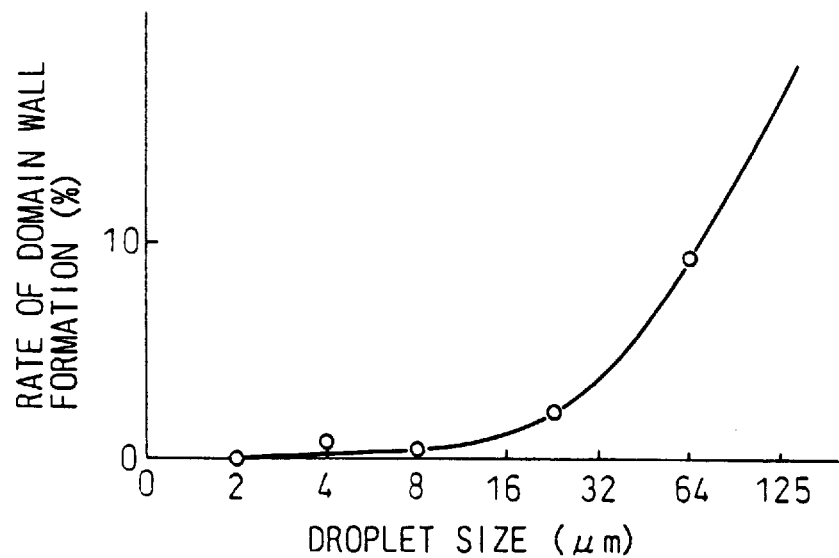
FIG. 5 is a graph showing the relationship between the particle size of the liquid crystal droplets and the rate of domain wall formation.

FIG. 5 is a graph showing the relationship between the particle size of the liquid crystal droplets and the rate of domain wall formation.

In FIG. 5, the x-axis denotes the particle size and the y-axis denotes the rate of domain wall formation.

According to this graph, the rate of domain wall formation with liquid crystal droplets up to a particle size of about 8 μm is almost zero, but when the particle size of the liquid crystal droplets exceeds about 8 μm, the rate of domain wall formation begins to gradually increase, and with liquid crystal droplets with a particle size of about 100 μm the rate of domain wall formation is about 15%, with a sharp rise thereafter.

When the rate of domain wall formation is high, the domain wall (discrimination) shows up as whiteness, leading to a reduction in display quality.

A rate of domain wall formation of about 15% was determined to be the threshold limit.

EXAMPLE 2

In the method of producing a liquid crystal display unit according to this example, liquid crystals are used whose dielectric anisotropy $\Delta\epsilon$ varies depending on the frequency of the voltage applied between the first transparent electrode 12 and the second transparent electrode 14, to simplify the production process and stabilize the orientation of the liquid crystal molecules.

Figure 6:
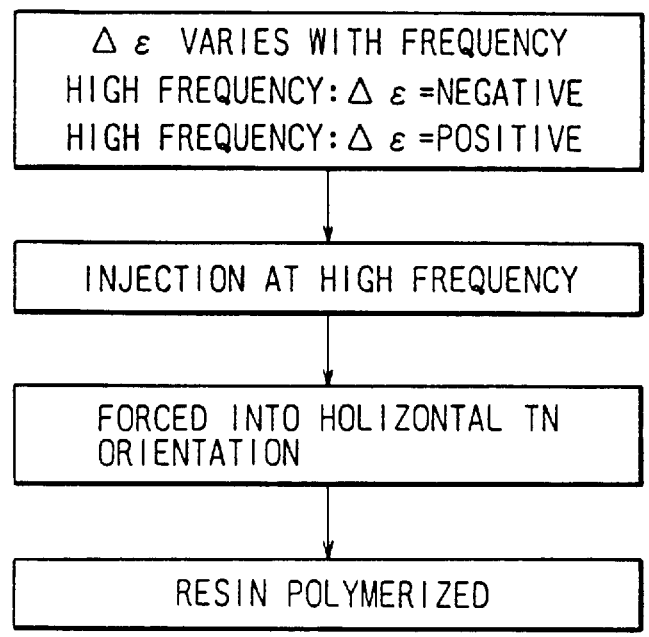
FIG. 6 is an illustration of the production process for the liquid crystal display unit of Example 2.
Figure 7A:
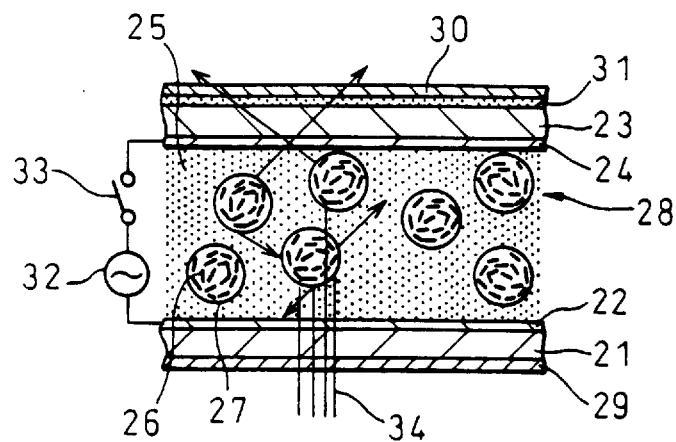
FIGS. 7A and 7B are illustrations of PDN-type liquid crystal display units of the prior art, FIG. 7(a) showing a state without application of voltage and FIG. 7(b) showing a state with application of voltage.
Figure 7B:
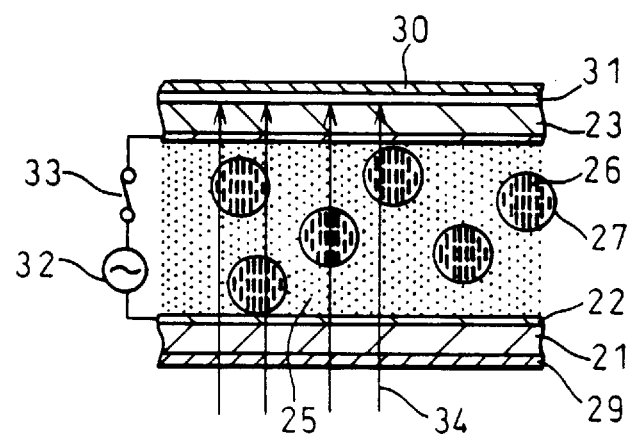
Figure 9:
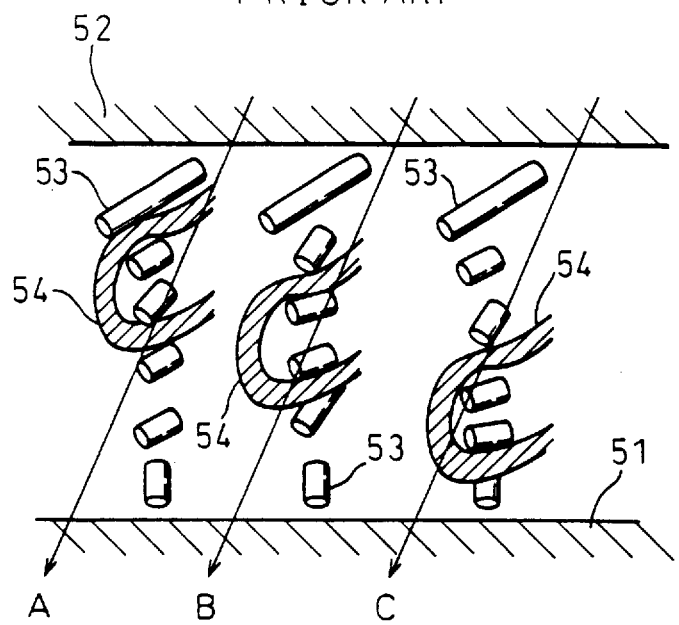
FIG. 9 is an illustration of a PTN-type liquid crystal display unit of the prior art.

FIG. 6 is an illustration of the production process for the liquid crystal display unit of Example 2.

To explain the method of producing the liquid crystal display unit of the present invention with reference to FIG. 6, a mixture of a polymer with liquid crystals whose dielectric anisotropy $\Delta\epsilon$ is negative when the frequency is high and whose dielectric anisotropy $\Delta\epsilon$ is positive when the frequency is low, is injected in the space between a pair of transparent electrodes while a voltage with a frequency higher than 100 kHz is applied between them, and ultraviolet light, etc. is irradiated thereon to polymerize the polymer and produce phase separation.

Since the dielectric anisotropy $\Delta\epsilon$ is negative at this time, the liquid crystal molecules try to align themselves horizontally and are forced into a horizontal TN orientation, with the liquid crystal molecules becoming twisted horizontally with respect to the transparent conductive base plates.

This process makes it possible to easily achieve alignment of the liquid crystal molecules in the liquid crystal droplets, such as shown in FIG. 1.

Since the liquid crystal display unit is driven at a voltage of lower than 100 kHz, the dielectric anisotropy $\Delta\epsilon$ of the liquid crystal layer is positive, and switching is possible to make the liquid crystal molecules horizontal when no voltage is applied and to make the liquid crystal molecules roughly vertical when a voltage is applied.

When no voltage is applied between the transparent conductive base plates, the plane of polarization of the light passing through the polarizer on the light incidence side is rotated, and is displayed as white upon passing through the polarizer on the light output side.

Also, when a voltage is applied between the transparent conductive base plates, incident light is unaffected by the liquid crystal layer, and thus it is blocked by the crossed Nicol construction to give a black display.

As explained above, according to the present invention there may be provided a liquid crystal display unit with brightness comparable to that of TN-type liquid crystal display units, without the occurrence of irregularities among the particles, and without inversion of the display, when the display surface of the liquid crystal display unit is viewed from an oblique inclination angle.

We claim:

1. A liquid crystal display unit, having a liquid crystal cell which comprises, between a pair of substrates, a polymer-dispersed liquid crystal including liquid crystal droplets dispersed in a polymer that comprises urethane-based UV-curing resin, a diameter of said liquid crystal droplets being between 3 $\mu$m and 100 $\mu$m, and liquid crystal molecules in said droplets being twisted to between 30° and 180°, the diameter of said liquid crystal droplets being greater than a space between the pair of substrates.

2. A liquid crystal display unit according to claim 1, wherein the dielectric anisotropy $\Delta\epsilon$ of the polymer-dispersed liquid crystal is positive in electric fields with frequencies lower than a certain frequency and negative in electric fields with frequencies higher than said certain frequency.

3. A liquid crystal display unit according to claim 2, wherein the dielectric anisotropy $\Delta\epsilon$ of the polymer-dispersed liquid crystal is positive in electric fields with frequencies lower than 100 Hz and negative in electric fields with frequencies higher than 100 Hz.

4. A liquid crystal display unit as claimed in claim 1, wherein said liquid crystal is a cholesteric phase liquid crystal.

5. A method for producing a liquid crystal display unit comprising:

filling a space between a pair of electrodes with a polymer-dispersed liquid crystal whose dielectric anisotropy is positive in electric fields with frequencies lower than a certain frequency and negative in electric fields with frequencies higher than said certain frequency; and applying to said polymer-dispersed liquid crystal a high frequency electric field in which the dielectric anisotropy of said polymer-dispersed liquid crystals is negative, to thus form liquid crystal droplets, the space between said pair of electrodes being smaller than a diameter of said liquid crystal droplets.

6. A method for producing a liquid crystal display unit as claimed in claim 5, wherein the filling step includes filling the space between said electrodes with a cholesteric phase liquid crystal.

7. A method for producing a liquid crystal display unit comprising:

filling a space between a pair of electrodes with a polymer-dispersed liquid crystal whose dielectric anisotropy is positive in electric fields with frequencies lower than 100 Hz and negative in electric fields with frequencies higher than 100 Hz; and applying to said polymer-dispersed liquid crystal, an electric field with a frequency higher than 100 Hz in which the dielectric anisotropy of said polymer-dispersed liquid crystals is negative, to thus form liquid crystal droplets, the space between said pair of electrodes being smaller than a diameter of said liquid crystal droplets.

8. A method for producing a liquid crystal display unit as claimed in claim 7, wherein the filling step includes filling the space between said electrodes with a cholesteric phase liquid crystal.

9. A liquid crystal display unit having a liquid crystal cell comprising:

a pair of electrodes; and a liquid crystal including liquid crystal droplets, at least some of said liquid crystal droplets having a diameter greater than a space between said pair of electrodes.

10. A liquid crystal display unit as claimed in claim 9, wherein said liquid crystal is a cholesteric phase liquid crystal.

* * * * *

UNITED STATES PATENT AND TRADEMARK OFFICE
CERTIFICATE OF CORRECTION

PATENT NO. : 5,892,560
DATED : April 6, 1999
INVENTOR(S) : Hidefumi YOSHIDA et al.

It is certified that error appears in the above-identified patent and that said Letters Patent is hereby corrected as shown below:

Col. 7, lines 41-42, change "space between the" to --liquid crystal layer,--.

Col. 9, line 23, change "substrates" to --electrodes--;
line 31, change "substrates" to --electrodes--.

Col. 10, line 33, change "7" to --5--.

Signed and Sealed this

First Day of February, 2000

Attest:

Q. TODD DICKINSON

*Attesting Officer*  *Acting Commissioner of Patents and Trademarks*